United States Patent Office 3,043,847
Patented July 10, 1962

---

3,043,847
PRODUCTION OF SALTS OF MERCAPTOTHIAZOLES
Bertrand Ernest Wilde, Wrexham, Wales, assignor to Monsanto Chemicals Limited, London, England, a British company
No Drawing. Filed Feb. 4, 1960, Ser. No. 6,593
Claims priority, application Great Britain Feb. 10, 1959
4 Claims. (Cl. 260—299)

This invention relates to the production of organic salts, and particularly to the production of salts of mercaptothiazoles.

Water-insoluble metal salts of mercaptothiazoles are usually prepared by mixing an aqueous solution of a salt such as the sodium salt of the mercaptothiazole with an aqueous solution of a soluble salt of the desired metal, and then filtering off the precipitated product. For example, the zinc salt of 2-mercaptobenzothiazole can be prepared by merely mixing aqueous solutions of the sodium salt of 2-mercaptobenzothiazole and of zinc sulphate, and recovering the insoluble zinc salt.

Most mercaptothiazoles, however, have a low solubility in water, and where the metal employed in the salt formation is only a weakly basic one the method referred to above suffers from the disadvantage that the product is normally contaminated with quite a large amount of the free mercaptothiazole.

It has now been found that the amount of free mercaptothiazole impurity in the required metal salt can be substantially reduced if ammonia or an amine is present in the reaction mixture.

The process of the invention is one for the production of a water-insoluble metal salt of a mercaptothiazole, in which the insoluble metal salt is formed in an aqueous medium from a water-soluble salt of the mercaptothiazole and a water-soluble metal salt and it is in contact with ammonia or an amine.

In practice the water-insoluble salt will normally be precipitated by mixing an aqueous solution of the water-soluble salt of the mercaptothiazole with an aqueous solution of the water-soluble metal salt.

The mercaptothiazole can be one selected from a wide range of substances, including mercaptothiazoles such as 2-mercaptothiazole and 4-mercaptothiazole, mercaptoisothiazoles, and thiazoles containing fused aromatic rings, particularly mercaptoarylthiazoles, such as 2-mercaptobenzothiazole and other mercaptobenzothiazoles. The mercaptothiazoles can contain substituents which do not interfere with the process of the invention, for instance hydrocarbon groups such as alkyl or aryl groups. Water-soluble salts of the mercaptothiazoles that can suitably be employed in the process are the potassium or ammonium salts, and particularly the sodium salts.

The process of the invention is particularly suitable for the preparation of a mercaptothiazole salt of a metal the ions of which are capable of forming a water-soluble amine complex with ammonia or an amine. Such metals are zinc, cadmium and mercury, and the process is in fact particularly adapted to the preparation of zinc salts of mercaptothiazoles. In general, in the process an aqueous solution of a water-soluble salt of the metal, such as the sulphate or chloride, is mixed with the mercaptothiazole component.

It is preferable in the process of the invention that ammonia is employed, but an amine can be used if desired, particularly a lower aliphatic amine such as for instance methylamine, dimethylamine or ethylamine.

The quantity of the ammonia or amine used in the process depends largely on the particular degree of improvement which is aimed at in the product. In general from 0.5% up to say 10% of ammonia (or an equivalent amount of an amine) by weight of the mercaptothiazole is suitable. The use of up to 5%, and particularly between 1.5% and 3% of ammonia (or equivalent amount of amine), gives good results.

In the process of the invention the ammonia or amine is preferably introduced after the water-insoluble salt of the mercaptothiazole has been precipitated from the aqueous medium, although the ammonia or amine can for instance be added to an aqueous solution of a water-soluble salt of the mercaptothiazole used as one of the starting materials.

The invention is illustrated by the following examples.

*Example 1*

This example illustrates the production of the zinc salt of 2-mercaptobenzothiazole by the process of the invention.

33 grams of 2-mercaptobenzothiazole were dissolved in a solution of 10.4 grams of sodium carbonate in 255 cc. of water and the solution was heated to 80° C. There was then added with stirring a zinc sulphate solution, prepared by dissolving 17.7 grams of zinc sulphate monohydrate in 90 cc. of water at 80° C. A granular precipitate appeared, and 1.6 cc. of aqueous ammonia (specific gravity 0.880) was added. The resulting mixture was stirred at 80° C. for one hour, the solid product was separated by means of a centrifuge, washed with water until free from soluble salts, and dried for 8 hours at 80–100° C.

The dried product consisted of 38.6 grams of zinc 2-mercaptobenzothiazole (98.5% of theoretical yield), containing 7% by weight of free mercaptobenzothiazole.

For the purpose of comparison a sample of the zinc salt was prepared using the procedure described above but with the omission of the ammonia solution. The zinc salt of 2-mercaptobenzothiazole obtained in this way contained 15% of free mercaptobenzothiazole instead of only 7%.

*Example 2*

This example illustrates the production of the zinc salt of 2-mercaptobenzothiazole having an even lower content of free mercaptobenzothiazole.

33 grams of 2-mercaptobenzothiazole were dissolved in a solution of 10.4 grams of sodium carbonate in 255 cc. of water and the solution was heated to 80° C. There was then added with stirring a zinc sulphate solution, prepared by dissolving 17.7 grams of zinc sulphate monohydrate in 90 cc. of water at 80° C.

3.2 cc. of aqueous ammonia (specific gravity of 0.880) were then added to the precipitated zinc salt. The resulting mixture was stirred at 80° C. for one hour, and the solid product was isolated as described in Example 1.

The dried product consisted of 38.0 grams of zinc 2-mercaptobenzothiazole containing slightly less than 2% by weight of free mercaptobenzothiazole.

It is intended to cover all changes and modifications of the examples of the invention herein chosen for purposes of disclosure which do not constitute departures from the spirit and scope of the invention.

What is claimed is:
1. In a process for the production of a water-insoluble metal salt of a mercaptothiazole, in which the insoluble metal salt is formed in an aqueous medium from a water soluble metal salt of the mercaptothiazole and a cation of a metal which forms a water-insoluble salt, the improvement which comprises contacting the precipitated insoluble metal salt with 0.5–10% by weight of the mercaptothiazole of a member of the group consisting of ammonia and lower alkyl amines for time and temperature sufficient to reduce the mercaptothiazole content of the water-insoluble salt and isolating a product consisting essentially of a mixture of the mercaptothiazole and metal salt of the mercaptothiazole containing not more than about 7% of the mercaptothiazole.

2. The process of claim 1 in which the cation is that of a metal selected from the group consisting of zinc, cadmium and mercury.

3. In a process for the production of a water-insoluble metal salt of mercaptobenzothiazole in which the insoluble metal salt is formed in an aqueous medium from a water soluble metal salt of mercaptobenzothiazole and a cation of a metal which forms a water-insoluble salt, the improvement which comprises contacting the precipitated insoluble metal salt with 0.5–5% by weight of the mercaptobenzothiazole of ammonia for time and temperature sufficient to reduce the mercaptobenzothiazole content of the water insoluble salt and isolating a product consisting essentially of a mixture of mercaptobenzothiazole and metal salt of mercaptobenzothiazole containing not more than about 7% of mercaptobenzothiazole.

4. In a process for the production of zinc mercaptobenzothiazole in which the zinc mercaptobenzothiazole is formed in aqueous medium from sodium mercaptobenzothiazole and a water soluble zinc salt, the improvement which comprises contacting the precipitated zinc mercaptobenzothiazole with up to 10% by weight of ammonia of the mercaptobenzothiazole in amount and for time and temperature sufficient to increase the assay of zinc mercaptobenzothiazole and isolating product consisting essentially of mixture of mercaptobenzothiazole and zinc mercaptobenzothiazole containing not more than about 7% mercaptobenzothiazole.

References Cited in the file of this patent

UNITED STATES PATENTS

| | | |
|---|---|---|
| 2,129,621 | Lichty | Sept. 6, 1938 |
| 2,407,565 | Mathes | Sept. 10, 1946 |
| 2,754,303 | Harman | July 10, 1956 |
| 2,798,106 | Hill et al. | July 2, 1957 |